United States Patent [19]

Dion et al.

[11] 4,397,481
[45] Aug. 9, 1983

[54] SUPPORTING CHASSIS FOR WORKING MACHINE, WITH CENTRAL FRAME AND SIDE-MEMBERS

[75] Inventors: Daniel J. Dion, Saint Pathus; Daniel G. Ranini, Varreddes, both of France

[73] Assignee: Poclain, France

[21] Appl. No.: 283,926

[22] Filed: Jul. 16, 1981

[30] Foreign Application Priority Data

Aug. 7, 1980 [FR] France .................................. 80 17453

[51] Int. Cl.³ .......................................... B62D 21/00
[52] U.S. Cl. ................................... 280/781; 280/798; 414/687
[58] Field of Search ................ 280/781, 785, 796–798, 280/800; 212/253, 247; 414/689, 694

[56] References Cited

U.S. PATENT DOCUMENTS

| | | | |
|---|---|---|---|
| 1,629,890 | 5/1927 | Ronk | 280/781 |
| 2,134,866 | 11/1938 | Esters | 212/253 |
| 2,144,760 | 1/1939 | Harnischfeger | 212/253 |
| 3,861,498 | 1/1975 | Grove | 280/797 |
| 4,037,894 | 7/1977 | Sankey | 212/253 |
| 4,231,699 | 11/1980 | Thompson | 280/781 |

FOREIGN PATENT DOCUMENTS

| | | |
|---|---|---|
| 1115426 | 10/1961 | Fed. Rep. of Germany . |
| 1816619 | 6/1970 | Fed. Rep. of Germany . |
| 2329495 | 5/1977 | France . |
| 2467131 | 4/1981 | France . |
| 2061205 | 5/1981 | United Kingdom . |
| 2061206 | 5/1981 | United Kingdom . |

*Primary Examiner*—Robert R. Song
*Attorney, Agent, or Firm*—Lewis H. Eslinger

[57] ABSTRACT

The invention relates to a supporting chassis for a working machine, having a central frame provided, on each side of its longitudinal middle plane, with an indentation, whose general concavity is transversely directed opposite the middle plane, and which is delimited by two transverse arms, each one including a substantially vertical cross-plate, and, further having two longitudinal side-members placed on either sides of the middle plane, substantially parallel thereto, the ends of the arms defining an indentation which constitutes the areas where the central frame is secured by welding to the corresponding side-member, each arm being secured to the side-member essentially by welding the outermost edge of the cross-plate of this arm to the side-member, and the invention finding an application in the production of a hydraulic bucket loader with strong chassis.

12 Claims, 10 Drawing Figures

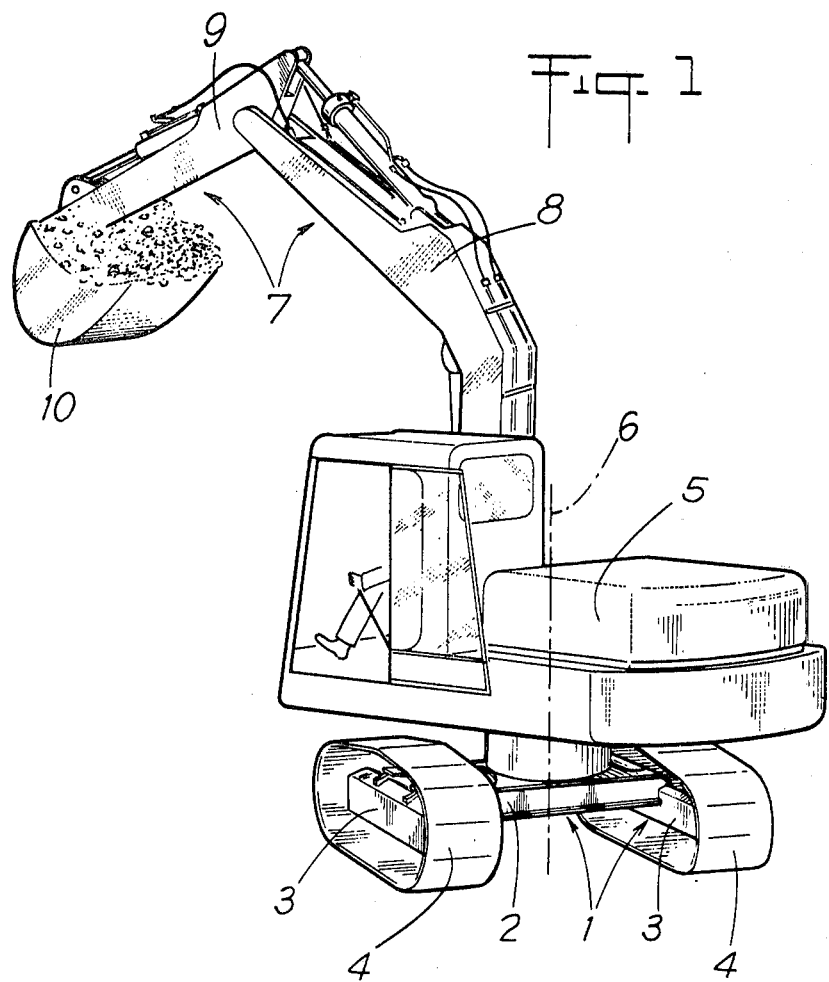

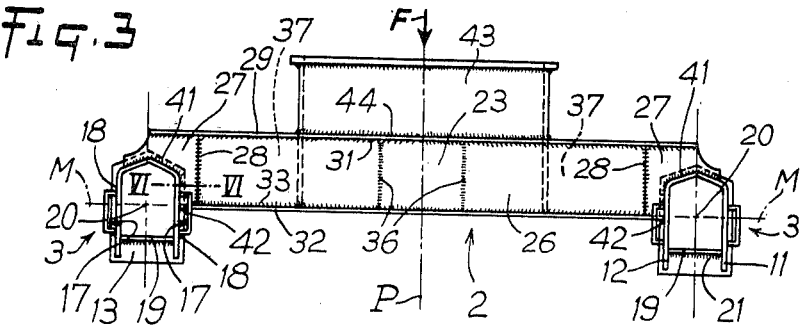
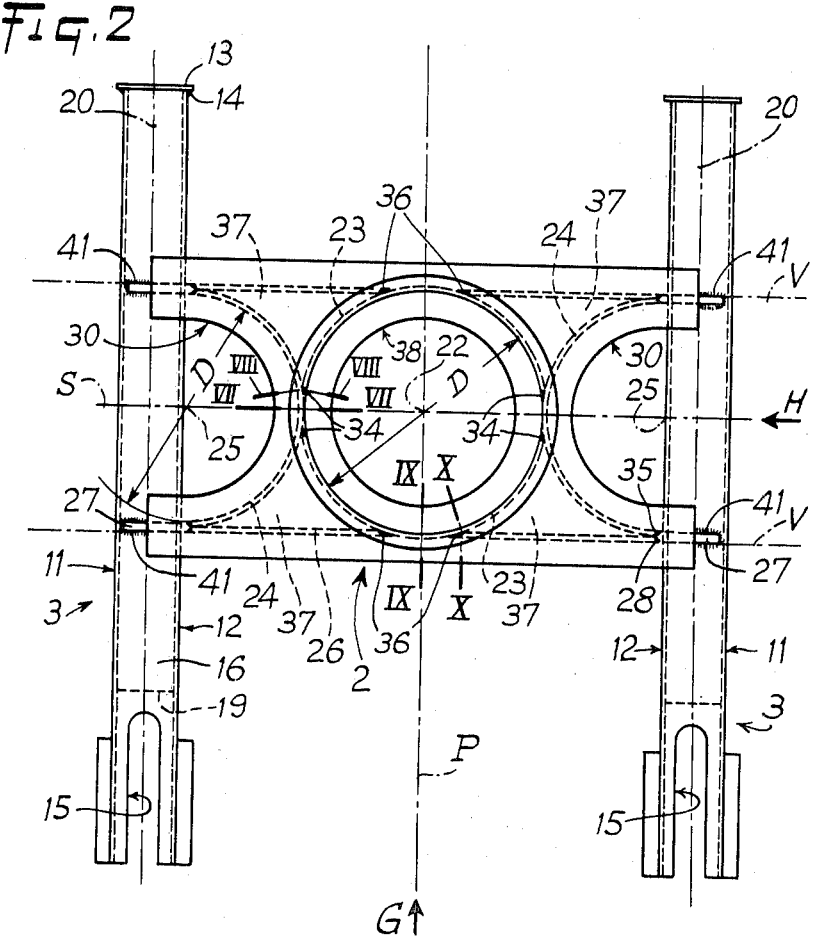

SUPPORTING CHASSIS FOR WORKING MACHINE, WITH CENTRAL FRAME AND SIDE-MEMBERS

A large number of public works machines, such as hydraulic bucket loaders, have a supporting chassis constituted by the assembly of a central frame and two longitudinal side-members.

Many structural problems arise from the assembly, as the frame and side-members are all required to show great rigidity, but their connection can also be relatively flexible although of course it has to be mechanically strong.

It is the object of the invention to propose a new supporting chassis or sub-frame which solves the aforesaid problems, with the added advantages of a light structure, of an easy manufacture and of low production cost.

The invention therefore relates to a supporting chassis for a public works machine, such as a hydraulic bucket loader, which has a central frame provided, on each side of its longitudinal middle plane, with an indentation, whose general concavity is transversely directed opposite the middle plane, and which is delimited by two transverse arms, each one comprising a substantially vertical cross-plate, and, two longitudinal side-members placed on either sides of the middle plane, substantially parallel thereto, the ends of the arms defining an indentation which constitutes the areas where the central frame is secured by welding to the corresponding side-member.

Each arm is secured to the side-member essentially by welding the outermost edge of the cross-plate of this arm to the side-member.

Preferably, the following advantageous dispositions are also adopted, namely, each arm has a general prism-like shape which makes it look substantially like a dihedron, the arris of which is situated close to the welding area, and, which is delimited by two separate plates, the substantially vertical cross-plate, and the plate delimiting the indentation, whereas the cross-plate is composite and constituted by an end-plate welded to the side-member by one of its edges, and by a central plate, which joins up and is assembled with the plate defining the indentation, both plates being welded on the other edge of the end-plate.

The sum of the thicknesses of the plate delimiting the indentation and of the central plate is at the most equal to the thickness of the end-plate, the edges of the first two plates being placed to face the edge of the last.

The central plate and the end-plate are substantially co-planar, the plate delimiting the indentation being curvilinear and joining up substantially tangentially with the central plate.

The end-plate has a calibrated profile which corresponds to the cross-section of the side-member in the welding area.

The central frame is constituted by a substantially cylindrical ferrule support and by arms secured by welding to the ferrule support, symmetrically with respect to the middle plane, in which each arm constitutes, with the part of the ferrule support on which it is welded, a prism with a substantially triangular base.

Also two of the sides of the base are curvilinear and constitute the part of the the ferrule support and the section of the plate delimiting the indentation, and the plate delimiting the indentation is constituted by a portion of a cylinder of a diameter substantially equal to that of the substantially cylindrical ferrule support.

The plates delimiting the indentations of the two arms placed on the same side with respect to the longitudinal middle plane form a semicircular cylinder.

Also, the substantially vertical cross-plates delimiting two arms situated on both sides of the longitudinal middle plane and substantially symmetrically with respect to the plane, extend one from the other.

Further, each arm constitutes with the ferrule support on which it is welded a coffer member closed by lower and upper plates, in which the lower plate of one arm is welded to the corresponding side-member substantially at the point of intersection of the latter with the horizontal plane traversing its central axis.

The invention will be more readily understood on reading the following description with reference to the accompanying drawings, in which:

FIG. 1 is a perspective view of a hydraulic loader comprising a chassis according to the invention;

FIG. 2 is a view from above, along arrow F of FIG. 3, of the chassis of the loader shown in FIG. 1;

FIG. 3 is a view along arrow G of FIG. 2;

Figure 4:
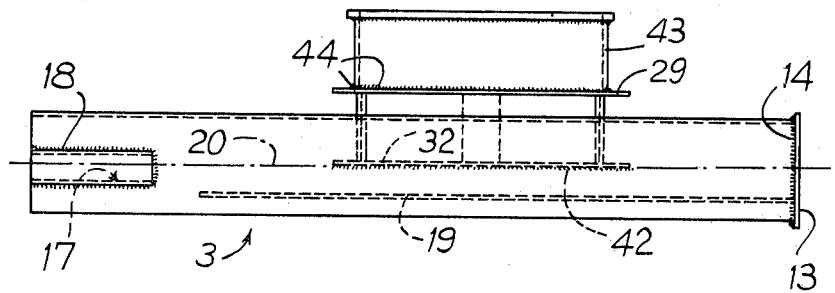
FIG. 4 is a view along arrow H of FIG. 2.
Figure 5:
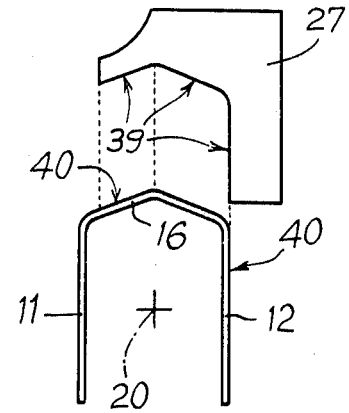
FIG. 5 is an exploded view showing a constructive detail of the chassis shown in FIGS. 2 to 4.
Figure 6:
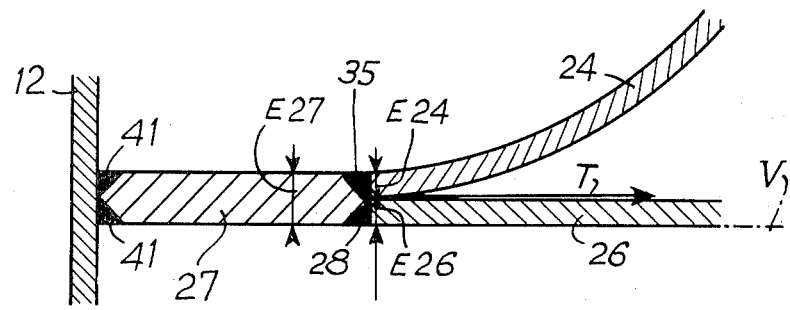
FIG. 6 is a cross-sectional view along VI—VI of FIG. 3.

FIG. 1 shows a hydraulic loader comprising a supporting chassis 1 according to the present invention. According to a conventional disposition, the supporting chassis is constructed by a central frame 2 assembled with two longitudinal side-members 3. Side members 3 support the moving members of the machine which, in the illustrated example, are constituted by tracks 4. A turret 5 is rotatably mounted on central frame 2, for pivoting about a vertical axis 6. The working equipment 7 of the loader is coupled to the turret 5 and comprises also in a known manner, a boom 8, a dipper-arm 9, and an excavating bucket 10.

Each side member 3 is constructed of a folded metal sheet, forming inverted U and thus consists of two flanks joined together by an upper plate 16. The flanks are parallel with respect to each other and extend longitudinally in the horizontal direction, and are substantially contained in vertical planes, that is, as the external flank 11 and the internal flank 12 as shown in FIG. 2. A vertical cross-plate 13 is welded at 14 to the edges of one of the ends of the flanks and to the upper plate 16 of each side-member 3.

A longitudinal opening 15 is provided in the upper plate 16 at the other end portion thereof and allows the fitting of a tension wheel for the driving chain of the track 4 which is supported by the respective side-member. Horizontal guides 17 are also secured by welding at 18 to the external 11 and internal 12 flanks in the other end portion, and extend longitudinally, which guides make it possible for the axis of rotation of the tension wheel to be fitted for sliding movement with respect to the side-member.

Additionally, a horizontal plate 19 extends inside the U-shaped section of each side-member, over approximately three-quarters of the length of the side-member, and is disposed from the end plate 13 along to the bottom portion of the guides 17, and underneath the central axis 20 of each side-member. The plate 19 is welded at 20 to the internal faces of the flanks and to the end-plate 13.

The central frame 2 has a plane of symmetry P, which is a longitudinal middle plane to which the flanks 11 and 12 of the side-members are parallel. The frame 2 includes:

a cylindrical ferrule support of very substantially circular cross-section (diameter D) having a vertical axis 22 contained inside the plane P, further constituted by two generally semi-cylindrical plates 23, disposed symmetrically with respect to a vertical plane S traversing the axis 22 and perpendicular to the plane P.

Further two plates 24, also of generally semi-cylindrical shape, having vertical axes 25, end disposed symmetrically with respect to the plane P, each one also disposed symmetrically with respect to the plane S, so that the diameter which is also equal to D and defines its semicircular cross-section, is parallel to the plane P and substantially contained in the internal flank 12 of a side-member 3.

Additionally two cross-plate assemblies, each one contained in a vertical plane V parallel to the plane S, and each one comprising two sub-assemblies disposed symmetrically with respect to the plane P and being individually constituted by a central plane 26 which extends from the plane P towards one of the side-members 3, and, further by an end-plate 27, on the edge of which is welded at 28 the central plate 26.

A horizontal upper plate 29, bordered at the top, and to which are welded at 31(a) the plates 23 which constitute the ferrule support, (b) the plates 24 of generally semi-cylindrical shapes delimiting indentations 30 with concavities directed toward the side-members 3, and (c) the central cross plates 26 and the cross end plates 27 having a concave surface.

In FIG. 3, a horizontal lower plate 32 is also shown delimited at the bottom, and to which is welded at 33 the plates 23, 24, 26 and 27.

Also to be noted is the existence of the following welded assemblies and in particular vertical welding at 34 of the vertical end edges of the plates 23 on the convex face of the plates 24;

vertical welding at 35 of the vertical end edges of the plates 24 on the vertical edges of the end-plates 27, the end-plates 27 being thick, of thickness E27 at least equal, preferably, to the sum of the thicknesses E24 and E26 of the plates 24 and 26, the plate 24 being in addition substantially tangential (T) to the plate 26 in the area of the weldings at 28 and 35; and the vertical welding at 36 of the other vertical end edges of the central plates 26 on the convex faces of the plates 23 constituting the ferrule support.

These various welded assemblies lead to the constitution of four sealed prismatic coffers or arms 37, having a curvilinear triangular horizontal section, which coffers 37 extend from the convex face of the ferrule support and, which are disposed symmetrically with respect to the planes P and S and are each defined by a plate 23, a plate 24, a plate 26, and by upper plate 29 and lower plate 32.

The following particular characteristics should be noted:

the upper plate 29 and lower plate 32 slightly overlap the edges of the vertical plates to which they are welded at 33 and are defined by circular arcs, amongst which a central circle 38 which has a central recess of the central frame 2.

Further, each end cross-plate 27 has a profile 39 whose shape corresponds exactly to the shape of the external face 40 of the internal flanks 12 and upper plate 16 of the side-members. Additionally, the central frame 2 is assembled to each side-member 3 by applying the corresponding profiles 39 of the two end-plates 27 on the external face 40, and by welding at 41 the elements, and, also by welding at 42 the lower plate 32 on the external face of the internal flank 12. Also, lower plate 32 is welded to the internal flank 12 along a horizontal line which substantially coincides with the intersection of the internal flank 12 with a horizontal plane M traversing the central axis 20.

Figure 7:
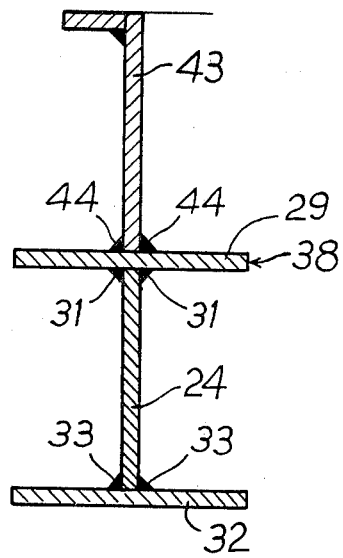
FIGS. 7, 8, 9 and 10 are cross-sections along VII—VII, VIII—VIII, IX—IX and X—X, respectively, of FIG. 2.
Figure 8:
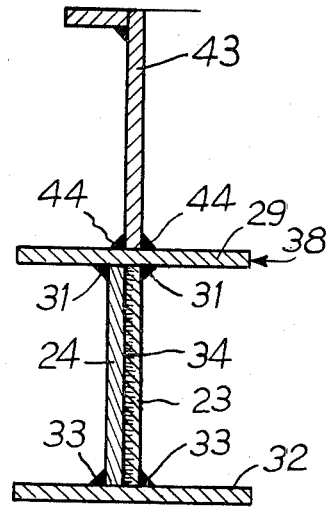
Figure 9:
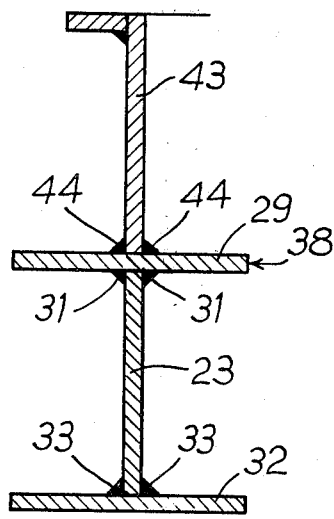
Figure 10:
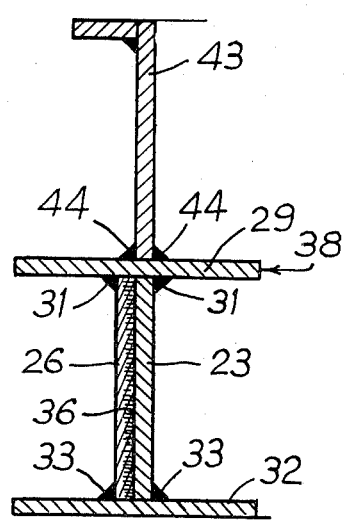

As can be seen in FIGS. 7 to 10, in the joining areas of plates 23 and 24 on the one hand, and 23 and 26 on the other hand, the sections of the material constituting the central frame 2 are I-sections.

The upper plate 29 has placed a cylindrical shank in sheet metal 43 which is welded at 44 to the upper plate 29, and has as its axis, the axis 22, and is situated substantially plumb with the semi-cylindrical plates 23 which constitute the ferrule support, and precisely constitutes the ferrule designed to support the means to assemble the turret 5 for vertical rotation.

Before noting the advantages of the structure described hereinabove, it should be indicated that the invention is not limited to that particularly described sole structure, but that it covers also the following embodiments, where there is no central ferrule support (23) but nonetheless the plates 24, 26 and 27, as well as the lower plate 32 and the upper plate 29, are provided, and these different plates can then constitute one coffer only.

The plates 24 are then replaced by flat plates, thus transforming the bicurvilinear triangular section of the coffers 37 into sections with only one curvilinear side, which is constituted by the plate 23.

The structure described hereinabove presents many advantages, amongst which include an easy assembly of the central frame 2 with the side-members 3 by accessible weldings at 41 on both sides of each end cross-plate 27, hence weldings of good mechanical quality. Further, the progressiveness of the junction between the plates 24 and 26 and the plate 27, not only where the thicknesses of these plates are concerned (E27 equal or greater than E24+E26), but also where the shapes adopted are concerned (tangential connection of E24 to E26, and, plates 27 and 26 extending one from the other—plane V), is a guarantee of good mechanical strength and of optimum utilization of the material. Also, this is provided by the great rigidity of the central frame 2 due to the coffered structure 37, and the relative flexibility of the main connection (welding 41) between frame 2 and each side-member 3, linked to the relative flexibility of the end cross-plates 27, which are thick, but on the other hand, which alone ensure the main connection. Additionally, there is no concentration of strains in the welding area 42 connecting the lower plate 32 to the internal flanks 12, due to the special disposition of the welding lines 42, which are at the level of the central axes 20 under stress. There is an easy preparation of the end plates 27, which, being of small size but of great thickness E27, can be cut separately and are easily handled.

In short, what is always much sought after, but often in vain, is obtained here, namely a configuration which provides a very strong central frame 2, which is absolutely necessary to support adequately the turret 5; and a connection of the frame with the side-members which is free of excessive strain concentrations, this being advantageous to avoid breaks in the joining areas of the chassis; and, the lightest possible structure, this being obviously an advantage, especially where production costs and subsequent use of the machine are concerned.

The invention is in no way limited to the description given hereinabove, and on the contrary covers any variants that can be brought thereto without departing from the scope or the spirit thereof.

What is claimed is:

1. Supporting chassis for a working machine, comprising:

a transversely extending central frame including indentations positioned on opposite sides of a longitudinal middle plane thereof, said indentations having a general concavity extending in a transverse direction away from said middle plane, and two transverse arms which border each said indentation; each arm being formed at least partially by a first plate which defines one said indentation and a cross-plate having opposite ends and positioned in a substantially vertical plane, each cross-plate being formed by a central plate assembled with said first plate and at least one end plate, each end plate being welded at an inner edge thereof to said respective central plate, and each arm having a prism-like configuration substantially dihedron in shape; and two longitudinal side-members placed on opposite sides of and substantially parallel to said middle plane, and the ends of each cross-plate defining indentations which form welding areas where the central frame is secured by welding to the side-members such that said arms are secured to the side members by welding an outermost edge of each end plate to a respective side-member, and said prism-like configuration having an arris which is situated close to said welding areas.

2. Supporting chassis as claimed in claim 1, wherein the sum of the thicknesses of each first plate defining the indentation and the central plate is not greater than the thickness of the end-plate, edges of said first plate and said central plate being positioned to face the inner edge of said end-plate.

3. Supporting chassis as claimed in claim 2, wherein the central plate and the end-plate are substantially co-planar, each first plate defining the indentation being curvilinear in configuration and positioned substantially tangential to said central plate.

4. Supporting chassis as claimed in claim 1, wherein the end-plate has a profile corresponding to a cross-section of the respective side-member in the welding area.

5. Supporting chassis as claimed in claim 1, wherein the central frame includes a substantially cylindrical ferrule support and said arms are secured by welding to the ferrule support, symmetrically with respect to the middle plane.

6. Supporting chassis as claimed in claim 5, wherein each arm includes in combination with the part of the ferrule support on which it is welded, a prism having a substantially triangular base.

7. Supporting chassis as claimed in claim 6, wherein two of the sides of said triangular base are curvilinear in shape and form part of the said ferrule support and a section of said first plate defining the respective indentation.

8. Supporting chassis as claimed in claim 7, wherein each first plate defining an indentation is formed by a portion of a cylinder having a diameter substantially equal to that of the substantially cylindrical ferrule support.

9. Supporting chassis as claimed in claim 8, wherein the first plates defining the indentations each form a semi-circular cylinder.

10. Supporting chassis as claimed in claim 9, wherein the substantially vertical cross-plates defining two arms positioned on each side of the longitudinal middle plane, extend one from the other.

11. Supporting chassis as claimed in claim 10, wherein each of said arms form with the ferrule support to which it is welded a coffer member closed by lower and upper plates.

12. Supporting chassis as claimed in claim 11, wherein the lower plate of each said coffer member is welded to the respective side-member substantially at the point of intersection of the side-member and a horizontal plane traversing a central axis thereof.

* * * * *